United States Patent [19]

Nicoud

[11] 3,852,572

[45] Dec. 3, 1974

[54] IDENTITY CARD READER

[75] Inventor: Jean-Daniel Nicoud, Belmont, Switzerland

[73] Assignee: Sodeco/Saia, Geneva, Switzerland

[22] Filed: Jan. 3, 1973

[21] Appl. No.: 320,749

[30] Foreign Application Priority Data

Jan. 3, 1972 Switzerland........................ 3072/72

[52] U.S. Cl. ...................... 235/61.11 E, 250/219 D

[51] Int. Cl. ............................................. G06k 7/10

[58] Field of Search............235/61.12 R, 61.12 N, 235/61.12 M, 61.11 E, 61.11 R, 235/61.11 D; 250/219 D, 219 DC

[56] References Cited

UNITED STATES PATENTS

| | | | |
|---|---|---|---|
| 3,050,248 | 8/1962 | Lindquist | 340/172.5 X |
| 3,491,337 | 1/1970 | Guzak et al. | 340/365 R |
| 3,582,617 | 6/1971 | Berler | 235/61.11 E |
| 3,621,265 | 11/1971 | Berler | 235/61.11 E X |
| 3,627,993 | 12/1971 | Cooper | 235/61.9 R X |
| 3,684,865 | 8/1972 | Sakamoto | 235/61.11 E |

*Primary Examiner*—Thomas J. Sloyan

*Attorney, Agent, or Firm*—Morgan, Finnegan, Durham & Pine

[57] ABSTRACT

The present invention refers to a card reader for identification cards which bear data arranged in a plurality of coded information tracks, comprising a parity check track, a clock track, and identity tracks. The coded elements of these tracks are arranged in columns having related information contained therein. A number of reading heads corresponding to the number of tracks are arranged in a column in the reader apparatus at the interior wall of a slot constructed in the apparatus which is intended to receive the cards. These reading heads are connected to evaluation circuits.

4 Claims, 13 Drawing Figures

IDENTITY CARD READER

PRIOR METHODS OF CARD READING

The known readers for cards provided with markings can be placed in two classes on the basis of the reading method.

A first class comprises readers which scan the entire markings by means of mechanical contacts or photocells in parallel. The reading is brought about as soon as the card has assumed the correct place in the sensing housing. An electronic system permits the successive transfer of the numbers coded in each column of the cards. These readers have the disadvantage of having numerous individual parts and numerous lines. Furthermore, they permit only a slow checking of the cards, and a lever must be actuated for the reading.

The second class comprises readers which check the markings in lines one after the other. In this way the actual reading is greatly simplified, but a mechanical advancing device is required in order to impart the cards a constant speed during the reading. This drive device increases the space required by such readers and their price to a considerable extent.

With the development of card reading techniques for the field of data processing, many systems have recently been proposed for the checking of identity cards, such as credit cards, identification and key cards, merchandise order and transmittal cards and similar documents in card form.

In one known reader of the aforementioned second class, use is made of cards which are provided with information arranged in tracks and columns. The code elements representing information contained in each case in a track extending in the reading direction. At the beginning or end of each track, an additional distinguishing characteristic is provided to determine the direction of reading of the card. In the known reader, reader heads adapted in number and spacing to the individual tracks are arranged in a column line which extends perpendicular to the tracks, a mechanical advancing means moves the cards to be read past the reader heads. This reader thus requires a considerable expenditure for technical means and requires a large amount of space.

OBJECTS

The object of the present invention is to provide a reader for identity cards which takes up only a very small amount of space, requires few mechanical or electronic elements and allows for the cards to be transported manually during the reading operation. It is a further object of this invention to permit within an adjustable period of time, a reading which is as rapid as desired, even with interruptions, and to allow detection of the direction of reading while providing an indication of any possible errors caused in transport.

BRIEF DESCRIPTION

These objects of the invention are achieved in a reader of the aforementioned type by means of the following features:

A. The length of the slot is limited by an internal stop for the card and is smaller than the length of the card but greater than the length of the coded information tracks of the card;

B. On the inner end of the slot there is provided a switch which is connected to a timing member which activates the reading apparatus which has circuitry for analyzing the information from the various tracks;

C. The reading heads are connected with the information evaluation circuit. Those heads which are associated with the identity tracks and the parity check track lie on a straight line which is perpendicular to the longitudinal direction of the slot, while the reading head which is associated with the clock check track is offset with respect to said straight line by such a distance that its reading range, viewed in the longitudinal direction of the slot, overlaps the reading ranges of the other reading heads.

DESCRIPTION OF THE FIGURES OF THE DRAWINGS

The inventive concept as well as the preferred embodiment of an identity card reader in accordance with the invention will be explained in further detail with reference to the following figures:

FIGS. 1*a* and 1*b* show embodiments of identity cards which are particularly suitable for a reader in accordance with the invention. The identity cards have information markings arranged in tracks and columns. Four tracks which are designated 1, 2, 4 and 8 serve for the binary representation of the decimal numbers 0 to 9. A track designated P is provided for the parity check and a track designated S for the synchronization and detection of the direction of movement of the card. The synchronization track S has a hole in each column.

The uppermost track designated P permits a parity check, each column containing an even number of holes. In this way an erroneous punching of the card will trigger a signal which can be read by means of a simple electronic circuit which will be described later thereby indicating the error.

The four central tracks (8,4,2,1) correspond to the bits for the code of decimal numbers. For instance in Binary Coded Decimal (BCD) code, the cards shown in FIG. 1 show in the columns from left to right the coding of the decimal numbers 0, 1, 2, 3, 4, 5, 6, 7, 8, 9.

The use of another code, for instance XS3, permits the representation of the decimal numbers 0 to 9 by means of only five lines, including the synchronization line, without the use of a parity check track.

The number of characters can be increased as desired. Thus with six information lines and one synchronization line, and possibly with an additional parity line, all alpha-numeric characters can be coded on a card. Eight information lines permit the representation of two decimal numbers in each column and thus double the information contained on a card of given length, etc.

The dimensioning of the markings or holes can fundamentally be as desired. In practice, however, it is limited by the requirements of legibility or space.

Known punching systems for cards or computer tapes can be utilized to provide the columns of holes in the cards.

Figure 1A:
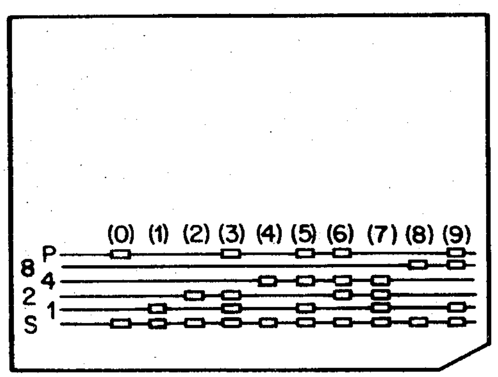
FIG. 1*a*, shows a typical identity card showing information bearing tracks arranged according to the invention.
Figure 1B:
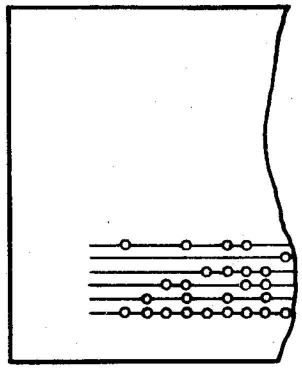
FIG. 1*b*, shows an alternate coded arrangement.
Figure 2A:
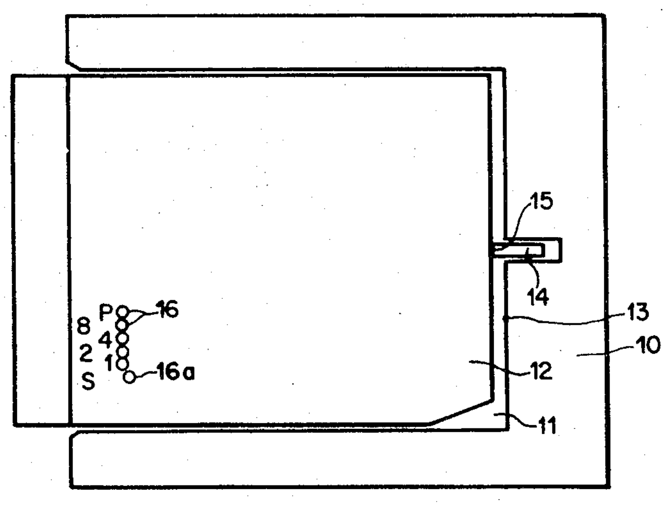
FIG. 2*a*, is a horizontal cross-sectional view of the card reader shown in FIG. 5, FIG. 2*b*, is a vertical cross-sectional view of the card reader shown in FIG. 5, FIG. 3, is a time graph, showing the time relationship of the signals from the reading heads as triggered by the coded information tracks of FIG. 1*a*, FIG. 4, a general block diagram of a typical information evaluation circuit, FIG. 5, a perspective view of the apparatus of this invention showing the card inserted, FIG. 6, a detailed block diagram of a typical information evaluation circuit.
Figure 2B:
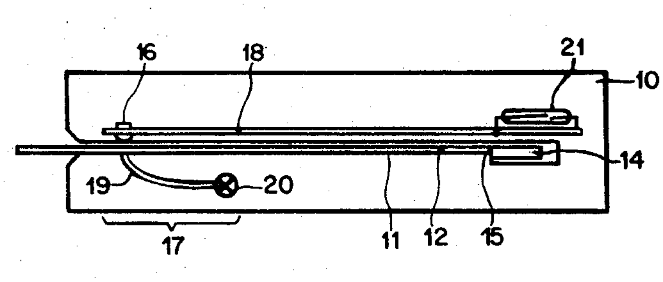

FIG. 2*a* is a section through the reader apparatus for the card of FIG. 1*a* in top view, and FIG. 2*b* in side view. In a box-shaped housing 10, there is provided a slot 11 to receive the cards 12, the remote end of which provides an inner stop 13 for the cards 12. The length of the slot 11 is less than the length of a card 12 but greater than the length of the tracks S, 1, 2, 4, 8 P plus the front free edge of the card 12. Shortly in front of the stop 13 there is arranged a small permanent magnet 14 which can be displaced in opposition to a spring (not shown), the front edge 15 of said magnet being flush with the stop 13 when the card 12 is completely inserted. The slot 11 is dimensioned so that the card 12 is readily received in the slot 11.

In FIG. 2*b*, the parts shown in 2*a* are provided with the same reference numbers. In the cross-sectional view of FIG. 2*b*, a photosensitive system 16 is arranged in the vicinity of the open end of the slot 11 opposite one of its flat sides, while an illuminating device 17 is arranged on the opposite flat side of said system 16. The photosensitive system 16 can consist, for instance, of six phototransistors the arrangement of which corresponds to the distance between the punched tracks of the cards. Five of the phototransistors correspond to the information tracks 1, 2, 4, 8 and the parity track P of the card and are perpendicular to the direction of advance of the card and thus parallel to the punched column thereof. The phototransistor 16*a* corresponding to the synchronization track S of the card 12 is on the other hand displaced with respect to said column towards one side of the line or the other by an amount corresponding to half the diameter of the dimension of the hole. In this connection, a relatively large amount of deviation can be permitted, and it is merely necessary that, in accordance with the invention, an overlapping of the reading areas is assured.

FIG. 2*b* shows, in addition to this arrangement, also how the phototransistors can be arranged in the reader on the one side of the reading slot 11, for instance on a printed circuit 18. The illuminating is effected by a glass fiber lens 19, located on the opposite side of the slot, which transmits the light of a single lamp 20 onto the card. However, other systems of illumination can also be used, for instance each phototransistor having a luminous diode arranged opposite thereto.

A magnetic leaf switch 21, for example, a reed switch, which repsonds to the permanent magnet 14 can be provided to detect the complete introduction of the card 12 in the slot 11.

The time graph of FIG. 3 will be explained in further detail with reference to the description of the manner of operation of the reader. It shows the signal sequence when the card is first of all pulled out correctly (signal sequence of the decimal places 0, 1, 2, 3, 4, 5, 6, 7, 8, 9) and when, after reading of the third column, it has again been pushed back (righthand part with signal sequence of the decimal places 0, 1, 2, 2).

Figure 4:
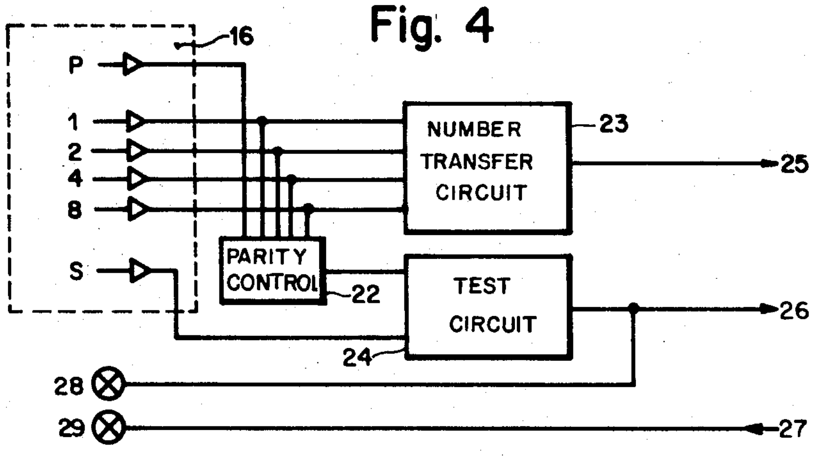

The block diagram of the electronic part of the reader shown in FIG. 4 indicates the reading heads of the photosensitive system 16 which correspond to the tracks P, 1, 2, 4, 8 and S, a circuit for parity check 22 connected therewith, a number transfer circuit 23 also connected with the system 16, and a test circuit for the signal sequence 24 as main components. The number transfer circuit 23 is provided with an output for information transfer 25, and the test circuit for the signal sequence 24, which circuit is controlled by the circuit for parity check 22 and the synchronization signal S of the photosensitive system 16, is provided with an error-indication output 26. The outputs 25 and 26 can, for instance, be connected with a central card number register, a computer or the like, which, when validity is verified, can supply a decision signal to an input 27 of the reader. The output of the test circuit for the signal sequence 24 controls an error indicator 28. The input 27 makes the decision signal visible on an indicating device 29. The indicating devices 28 and 29 can be simple bulbs.

Figure 5:
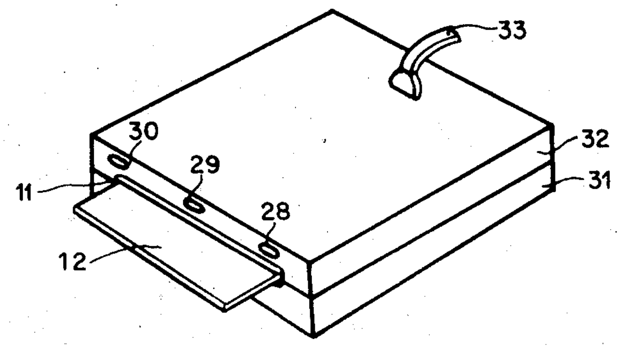

FIG. 5 shows the shape and the space requirement of one embodiment of a reader in accordance with the invention. This apparatus is intended, for instance, for cards of type V (59.1 × 82.5 mm) and can be connected with a central system for processing and transferring data via five lines, including the supply line, not shown in FIG. 4.

The reader can, as shown, in FIG. 5 have three bulbs 28, 29 and 30 in order to indicate to the user that the apparatus is ready for operation 30, that a card has been correctly read and found valid 29, or that an error is present 28 and thus the reading must be repeated.

Such a reader as shown in FIG. 5 can contain the entire electronic system of FIG. 4 for the coding of the information with the use of TTL or MOS technology. The closed-circuit consumption can be limited to a few mA at 5V, and, depending on the circuit used, from 50 to 200 mA in operation.

The apparatus shown in FIGS. 5, 2*a*, and 2*b* consists of an underpart 31 of molded plastic with photoconductor fiber bundles imbedded therein for the illuminating of the phototransistors 16 shown in FIG. 2, and a top element 32 of plastic which contains printed circuit 18 including the phototransistors 16. In addition bulbs 28, 29, 30 are provided therein for illumination and indication. The apparatus also includes a connecting cable 33 and a bottom contact 21 for detecting whether the card has been completely introduced. For complete secrecy of the operation, this contact 21 can consist of a reed switch which is actuated by a permanent magnet 14 as shown in FIG. 2*b* when displaced by the card 12.

Such a reader can be employed in a small opening, corresponding to its outside dimensions, in a wall or some other support. The maintenance and replacement thereof is easily effected.

Figure 6:
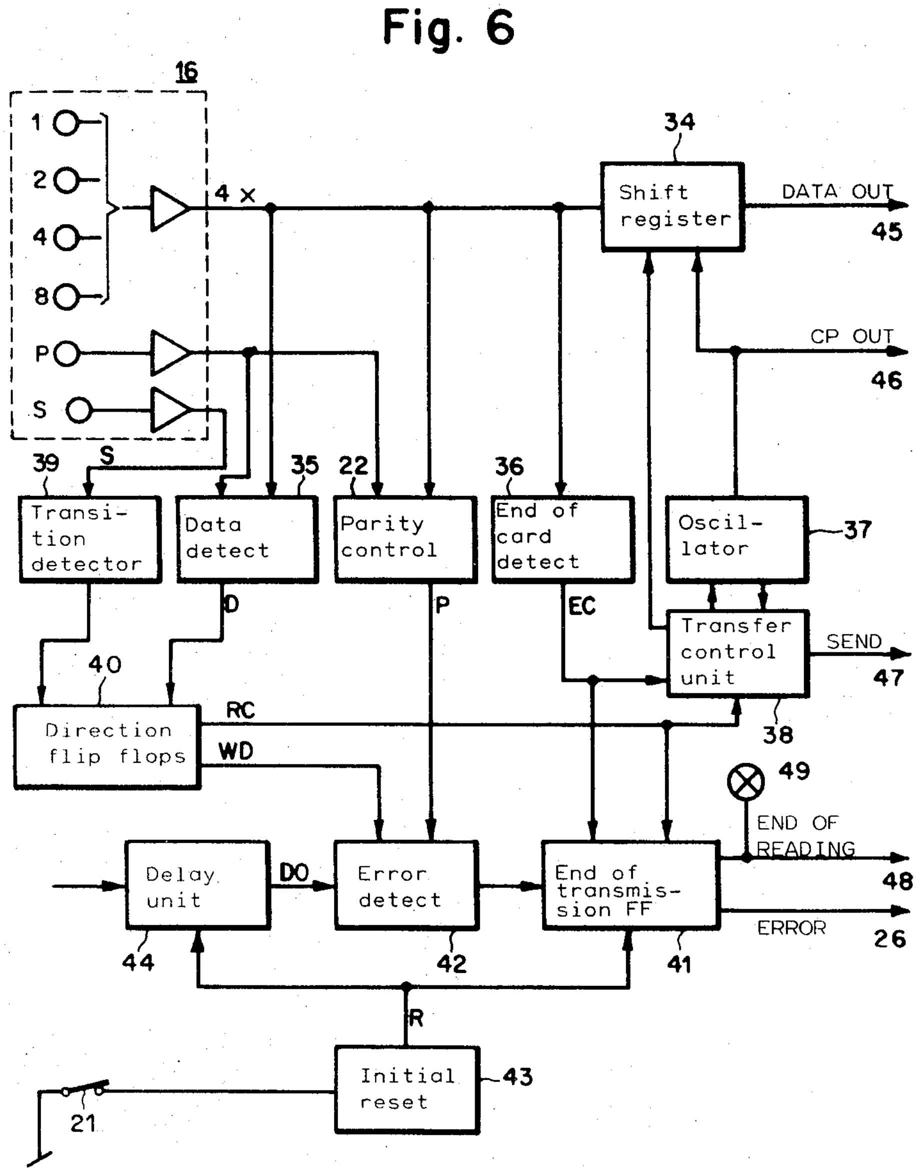

The block diagram of FIG. 6 shows a circuit developed with eight integrated circuits, four transistors and 11 diodes for the reading of six-track identity cards. The inputs of the photosensitive system 16 correspond to those of FIG. 3. The phototransistors are arranged for the parallel reading of the data represented in the binary system of tracks 1, 2, 4, 8 of the cards 12 and feed a shift register 34, a circuit for the information indication 35, a circuit for parity check 22 and a circuit for testing the end 36 of the card. The circuits for information indication 35 and for parity check 22 and also connected with the phototransistor, for the reading of the parity track P of the card 12. The circuit for information indication 35 is an OR circuit, the circuit for testing the end 36 of the card is an AND circuit, and the parity check circuit 22 is an exclusive OR circuit.

The shift register 34 is shifted by clock pulses of a clock generator 37. The latter, together with the signal at the output EC of the card-end tester 36 also controls a transfer-check circuit 38.

The phototransistor for the synchronization reading in the photosensitive circuit 16 acts on the input S of a movement detector 39. Its output signal, together with the signal at the output D of the circuit for the information indication 35 controls another circuit for indication of the direction of movement 40. The one output RC of the circuit for indication of the direction of movement 40 is connected on the one hand with the transfer check circuit 38 and on the other hand with a circuit for the transfer-end indication 41. The second output WD of the circuit for the indication of the direction of movement 40 together with the signal at the output P of the circuit for the parity check 22, controls a circuit for error indication 42.

The switch 21 shown in FIG. 2*b* there is actuated a return circuit 43 which has its output R connected on the one hand with a delay circuit 44 and on the other hand with the circuit for the transfer-end indication 41. The signal at the output DO of the delay circuit 44, together with the afore-mentioned signals P and WD, controls the circuit for the error indication 42. The output signal thereof, together with the signals EC and RC which have been previously mentioned, as well as R, controls the circuit for the transfer-end indication 41.

The circuit of FIG. 6 has five outputs. At an information output 45, the information coming serially from the shift register 34 appears in the form of binary signals. The clock pulses occur at the clock-pulse output 46. The transfer output 47 is connected with the transfer-check circuit 38. The circuit for the transfer-end indication 41 has a first output for the end of the reading 48 which is connected internally with a control bulb 49. The second output 26 (see FIG. 4) supplies signals in case of the occurrence of errors. It can possibly be connected with an error-indication bulb 28, as in FIG. 4.

MANNER OF OPERATION

The reading apparatus of the invention operates in accordance with the principle of the successive parallel reading of the punched columns of the card, in which connection, however, no mechanical advancing device is necessary. On the other hand, an additional row of holes for the synchronization S is required on the card. Nevertheless the simplification, the economy and the simple handling of the reader of the invention are extremely remarkable.

Figure 3:
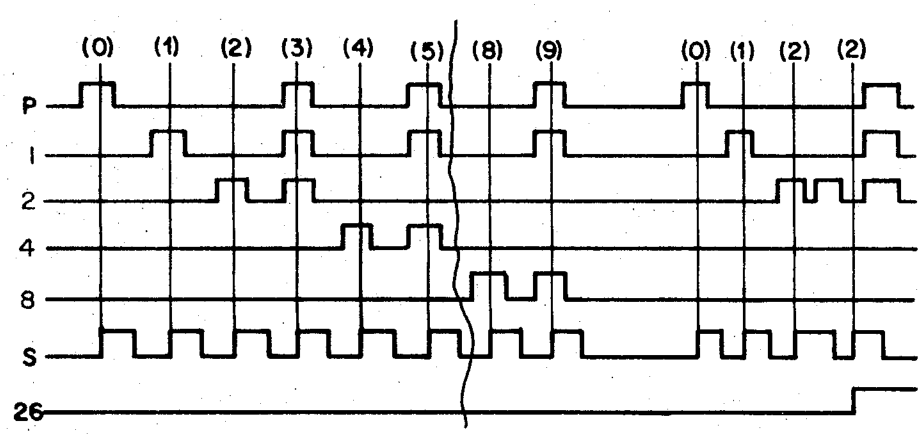

As shown in FIG. 3, the apparatus in accordance with the diagrams of FIGS. 4 and 6 receives and transmits the information marked on the card 12 when the sequence and parity of each column is in order. It shows an error at the output 26 when the card 12 is not properly pulled out, but has been pushed back again after reading of the third column. In this case, instead of the correct sequence of decimal numbers 0, 1, 2, 3, etc., there is read a sequence 0, 1, 2,2. In case of an error, a new reading can be attempted after the card has been again introduced to abut end of the slot. In practice, however, errors caused by improper operation are extremely rare.

Figure 7:
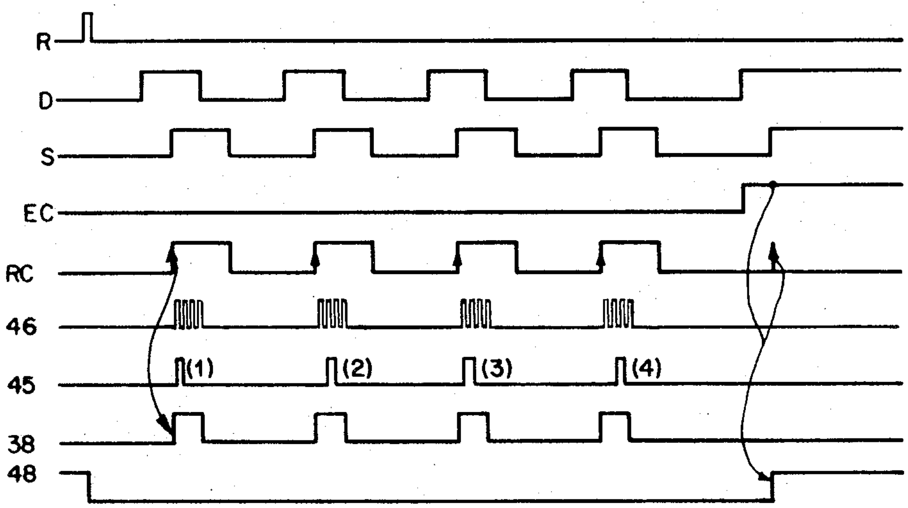
FIGS. 7 to 11 are time graphs showing the signals of the circuit illustrated in FIG. 6 during various modes of operation.

FIG. 7 shows the normal operation obtaining a correct reading from a uniform advancement of the card 12 in combination with the signals occurring in the circuit of FIG. 6. The input signals are shown in FIG. 3.

Let us assume that a card 12 has been removed from the slot 11 of the devices of FIGS. 2 and 5. By means of the end of the card, the information LLLL has been read, since all phototransistors 1, 2, 4, 8 P and S are lit. This L signal appears at the "End of Reading" output 48. This information can be transferred serially as desired. In this way the reader is ready for a new reading.

When a new card 12 is read, the "End of Reading" output 48 and the "Error" output 26 receive an L signal when one of the following errors is detected by the electronic system of FIG. 6.

a. Odd number of holes in the column (including S and P);

b. Reversal of direction of travel of the card in the slot over a distance of more than two columns upon reading.

c. Excessively slow reading (for instance if the card is left by error in the slot).

In the case of FIG. 7, such disturbances are not present. As soon as the card 12 has been completely introduced, the switch 21 is closed and a return pulse R is produced at the output of the return circuit 43. When the card 12 is pulled out of the slot 11 of the reader in accordance with FIGS.2 and 5, the L signal is produced by each punched column at the output D of the circuit for "Information Indication" 35. The information contained in the corresponding column is transferred in parallel into the shift register 34 as soon as the corresponding synchronization phototransistor S is illuminated. A group of four clock pulses each is produced at the "Clock-Pulse Output" 46 and the serial transfer of the information of each punched column is released at the "Information Output" 45. At the "Transfer Output" 47 an L signal is present each time during this transfer. The rear edge of the card is indicated by an L signal at the output EC of the card-end tester which also produces an L signal at the "End of Reading" output 48 of the circuit for the transfer-end indication 41.

Figure 8:
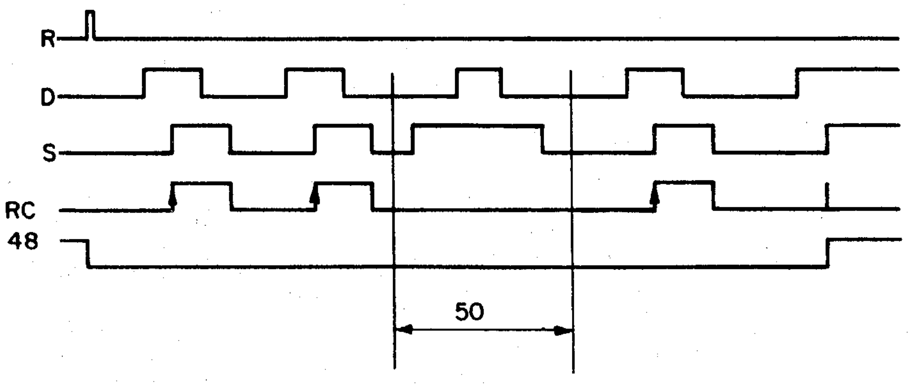

FIG. 8 shows the signal sequence resulting from correct reading when the card is returned less than one space between two punched columns 50. The diagram shows that the reading is not disturbed thereby. See in contradistinction to this FIG. 3, righthand side, as well as FIG. 9. The output RC of the circuit for the "Movement-Direction Indication" is not changed during this irregularity in movement.

Figure 9:
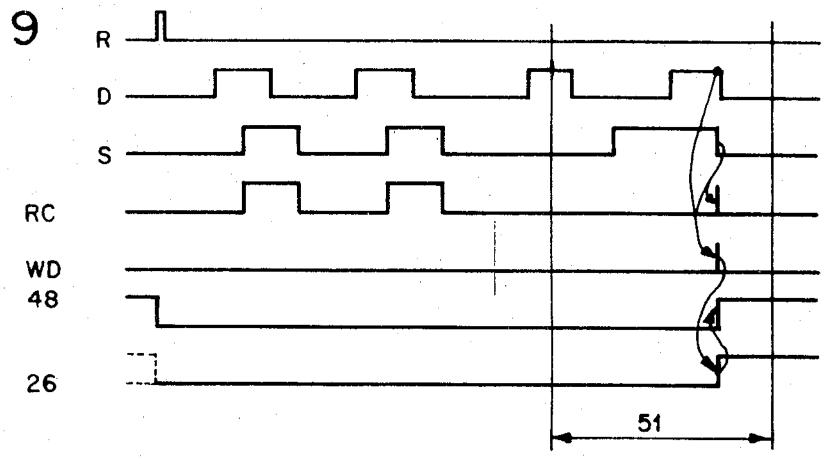

In FIG. 9 the signal sequence is shown in the case of an incorrect reading due to the card being returned by more than one space between two punched columns 51. The "Wrong Direction" output (WD) of the circuit for the "Movement-Direction Indication" 40 shows an L signal as soon as the permissible maximum of the rearward movement of the card is exceeded. Similarly, an L signal appears immediately at the "End of Reading" output 48 and at the "Error" output 26 of the "Transfer-End Indicator" circuit 41.

Figure 10:
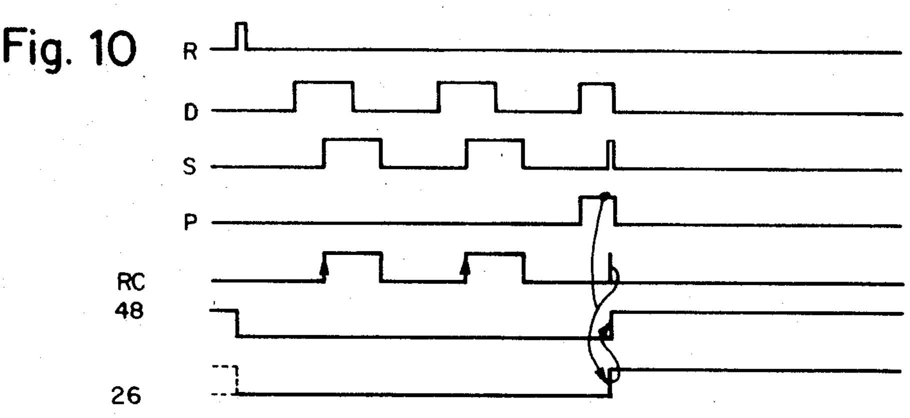

In accordance with FIG. 10, in the case of an incorrect reading due to a parity error signal an L signal occurs at the "End of Reading" output 48 and at the "Error" output 26 of the circuit for "Transfer Indication" 41. As soon as an error is detected by the parity check circuit, no further information is read.

Figure 11:
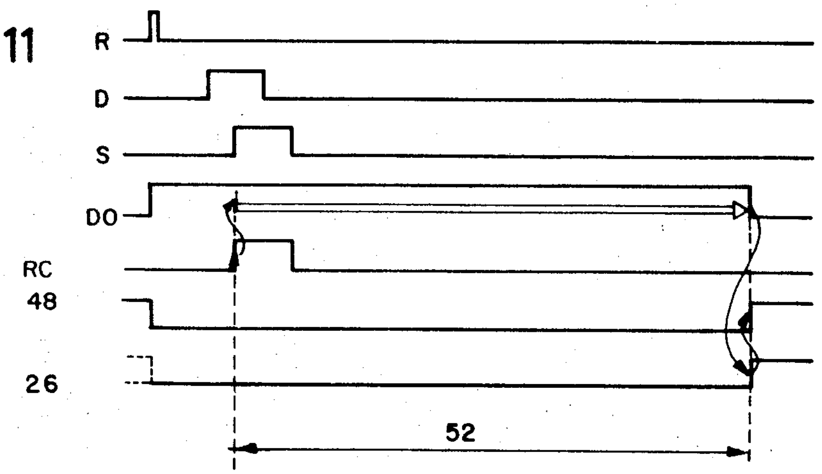

In accordance with FIG. 11, in the case of an incorrect reading due to an excessively slow reading, the output DO of the delay circuit 44 of FIG. 6 produces an L signal. After each setting pulse and after a maximum time of delay of, for instance, 5 seconds, this output DO is again set back. As shown in FIG. 11, the occurrence of a return signal produced by a delay 52 which exceeds this time during the reading of the cards leads to an "Error" indication 26.

DIFFERENT EMBODIMENTS

The apparatus described above permits the optical reading of punched cards or opaque cards which include white or transparent zones.

In case of signaling based on light reflection, the illumination and the photosensitive reading system must, to be sure, be arranged on the same side of the card. The reader of the invention can also be employed for cards which have embossed, magnetic or capacitive markings, or any other static or dynamic marking system, in which connection the reading heads are to be selected accordingly. In case of magnetic reading, to be sure, a sufficient speed of advance of the cards must be provided.

The reader of the invention is, however, particularly adapted to markings based on varying transparency, since the reading in this case can be effected with photodiodes, phototransistors, photoresistors or other photosensitive systems; in other words, by a purely electronic process. This permits high reliability at low cost.

The following card marking techniques may be employed: mechanical punching of rigid cards, punching of flexible cards, for instance of photographs, and gluing of transparent protective foils thereon.

The second technique has the advantage of a greater mechanical and chemical resistance and of an improved capability of cleaning over the customary punched cards. Instead of punching, simple surface markings can also be applied, for instance by a photo process. This, however, requires a more complicated manufacturing apparatus and, also it requires reading by reflection.

The reading of the punched markings or of elevated markings can be effected mechanically.

The reading is effected with the arrangement shown in FIGS. 1 and 2 when the card is manually pulled out of the reader. This solution is to be preferred for two reasons to the solution which is also possible in which the card is read upon introduction into the slot: First of all, it is easier to assure a uniform and continuous movement upon the pulling out. Second of all, the electronic part of the reader can be so developed that it is only active when the card has reached the end of the slot and this activity continues only until the reading and the acknowledgement thereof have been effected.

The selection of the manner in which the card is introduced into the slot can be left to the card owner. The use of cards with one or three cut corners can be employed to indicate an incorrect introduction. If the card is symmetric the card can be introduced in any manner desired.

ADVANTAGES

The system of the invention with the relative displacement of the synchronization and information signals makes it possible not only to detect the direction of movement of the card but also to effect the checking of the condition of the holes at the moment when these holes lies properly opposite the phototransistors. The use of a track with smaller holes, as in punched tape readers, is therefore unnecessary. The reading can be affected with any desired speed, the speed being limited only by the time of reaction of the phototransistors. As is known, it is possible with normal phototransistors to read up to 100,000 numbers per second. The reading apparatus of the invention therefore operates very rapidly so that the formation of lines of people in front of such a reader, for instance in front of gates, dispensing machines, vending machines, etc., can be avoided.

USE

There are many possibilities of use for such a reader, for instance for the automatic verification of credit cards in department stores, telephone stations, parking places, garages, hotels, etc. Used together with a lock it could also be a replacement for the key.

I claim:

1. Card reading apparatus for reading cards having a plurality of information bearing tracks, with indicia arranged in a predetermined pattern, including a direction synchronization track and a plurality of data, tracks, the indicia being arranged in columns transverse to the information bearing tracks, comprising:

a housing having a slot arranged therein for accommodating a card, said slot having a closed end and an open end for receiving the card;

detection means for each track to detect the indicia present in each track, said detection means for the direction synchronization track being offset relative to said detection means for said data tracks;

direction indicating means including bistable means electrically coupled to said synchronization track detection means and said data detection means for producing an error signal corresponding to a particular state of said bistable means to indicate that the card is being moved in the wrong direction relative to said detection means;

end of reading indicating means coupled to data detection means for producing a signal in response to removal of the end of the card from the slot; and data reading means coupled to data detection means for reading the information in the data tracks.

2. The card reading apparatus claimed in claim 1, including:

means positioned at said closed end of said slot for detecting the presence of a card;

delay means coupled to said detection means for generating an error signal after a predetermined time.

3. The card reading apparatus claimed in claim 1, wherein:

the length of said slot is greater than the length of the tracks and less than the length of the card.

4. The card reading apparatus claimed in claim 1 in which the card has a parity check track, including:

parity control means for monitoring the total number of indicia found in each column of the card and producing an error signal if the number of indicia in any column deviates from a predetermined standard.

* * * * *